United States Patent

Daniel et al.

[11] Patent Number: 6,075,484
[45] Date of Patent: Jun. 13, 2000

[54] METHOD AND APPARATUS FOR ROBUST ESTIMATION OF DIRECTIONS OF ARRIVAL FOR ANTENNA ARRAYS

[75] Inventors: Sam Mordochai Daniel, Tempe; Stephen Chihhung Ma, Mesa, both of Ariz.

[73] Assignee: Motorola, Inc., Schaumburg, Ill.

[21] Appl. No.: 09/305,347

[22] Filed: May 3, 1999

[51] Int. Cl.[7] ............................. H01Q 3/26; H01Q 3/00
[52] U.S. Cl. ........................................... 342/372; 342/377
[58] Field of Search ..................................... 342/422, 423, 342/377, 371, 372, 368, 378, 383

[56] References Cited

U.S. PATENT DOCUMENTS

| | | | |
|---|---|---|---|
| 4,771,289 | 9/1988 | Masak | 342/383 |
| 5,144,322 | 9/1992 | Gabiel | 342/373 |
| 5,754,138 | 5/1998 | Turcotte et al. | 342/372 |

OTHER PUBLICATIONS

An article entitled "Computionally Efficient Angle Estimation For Signals With Known Waveforms" by Jian Li, Bijit Halter, Petre Stoica and Mats Viberg from IEEE Transactions On Signal Processing, vol. 43, No. 9, Sep. 1995.

An article entitled "Direction Of Arrival Estimation Using Parametric Signal Models", by Ariela Zeira and Benjamin Friedlander from IEEE Transactions On Signal Processing, vol. 44, No. 2, Feb. 1996.

*Primary Examiner*—Thomas H. Tarcza
*Assistant Examiner*—Fred H. Mull
*Attorney, Agent, or Firm*—James E. Klekotka; Frank J. Bogacz; Sharon K. Coleman

[57] ABSTRACT

A direction of arrival (DOA)-aided digital beamforming (DBF) subsystem (300 FIG. 3) is provided for mitigating interference and increasing the frequency reuse factor in communication systems. The DOA-aided DBF subsystem is used to accurately position beams and nulls in at least one antenna beam pattern. By accurately directing beams at desired locations and nulls at undesired locations, the DOA-aided DBF subsystem provides a more efficient processing of antenna beam patterns in communication systems. The DOA-aided DBF subsystem is used in geostationary satellites, non-geostationary satellites, and terrestrial communication devices. The DOA-aided DBF subsystem uses a unique algorithm to determine DOA information that allows more efficient beam management and allows more subscribers to be served, while saving spectrum and power.

27 Claims, 3 Drawing Sheets

METHOD AND APPARATUS FOR ROBUST ESTIMATION OF DIRECTIONS OF ARRIVAL FOR ANTENNA ARRAYS

CROSS-REFERENCE TO RELATED APPLICATIONS

The present invention is related to the following co-pending United States Patent application that is assigned to the same assignee as the present invention:

"Method And Apparatus for Producing Wide Null Antenna Patterns", having Ser. No. 08/963,485, filed on Nov. 3, 1997.

FIELD OF THE INVENTION

This invention relates generally to phased array antennas and, more particularly, to a method and apparatus for robust estimation of directions of arrival for beams associated with antenna arrays.

BACKGROUND OF THE INVENTION

Satellite communication systems have used phased array antennas to communicate with multiple users through multiple antenna beams. Typically, efficient bandwidth modulation techniques are combined with multiple access techniques, and frequency separation methods are employed to increase the number of users. Because electronic environments are becoming increasingly dense, more sophistication is required for wireless communication systems. For example, with all users competing for a limited frequency spectrum, the mitigation of interference among various systems is a key to the allocation of the spectrum to the various systems.

Digital Beam Forming (DBF) systems have been developed for use in communications systems and radar systems. DBF systems require accurate direction of arrival (DOA) information to efficiently position beams and nulls in their antenna radiation/reception patterns. In DBF systems in which transmitters and receivers move relative to each other, DOA information is continually updated to maintain accuracy. Using accurate and up-to-date DOA information, a DBF system can improve its allocation of resources by placing beams on active and high-traffic areas, while avoiding unnecessary coverage of large inactive regions. This is particularly important when satellites are being used because the efficient determination of directions of arrival can decrease the required processing load and decrease the amount of on-board power required.

There is a need for a method and apparatus to accurately and efficiently determine a DOA estimation of incident signals received by phased array antennas in DBF systems. There is also a need for a method and apparatus to accurately and efficiently determine a DOA estimation of signals transmitted by phased array antennas in DBF systems. In addition, these needs are especially significant for satellite communication systems that include non-geostationary satellites and/or geostationary satellites.

BRIEF DESCRIPTION OF THE DRAWINGS

A more complete understanding of the present invention can be derived by referring to the detailed description and claims when considered in connection with the figures, wherein like reference numbers refer to similar items throughout the figures, and:

DETAILED DESCRIPTION OF A PREFERRED EMBODIMENT

The present invention provides a method and apparatus that increase the frequency and code reuse factor in communication systems by accurately and efficiently determining directions of arrival, thereby, allowing beams to be more accurately directed and closely spaced. The method and apparatus of the invention also provide more efficient processing of antenna beam patterns in communication systems. In addition, the method and apparatus of the invention are especially significant for use with non-geostationary satellites in satellite communication systems.

Digital beamforming is essentially an open-loop concept. A necessary input to a digital beamformer is the DOA information necessary to point the beams and nulls in the desired directions. When the DOA information is not precise, then these directions are not exactly correct, and the beams point away from the actual sources accordingly. In addition, their mutual nulls are shifted from their ideal locations, degrading the overall performance.

The invention combines an enhanced DOA estimation algorithm with a DBF based system to significantly improve the capacity of current and future communication systems, while remaining compatible with existing modulation techniques. In the invention, digital beamforming techniques are enhanced by, among other things, determining directions of arrival for desired and undesired incident signals.

Figure 1:
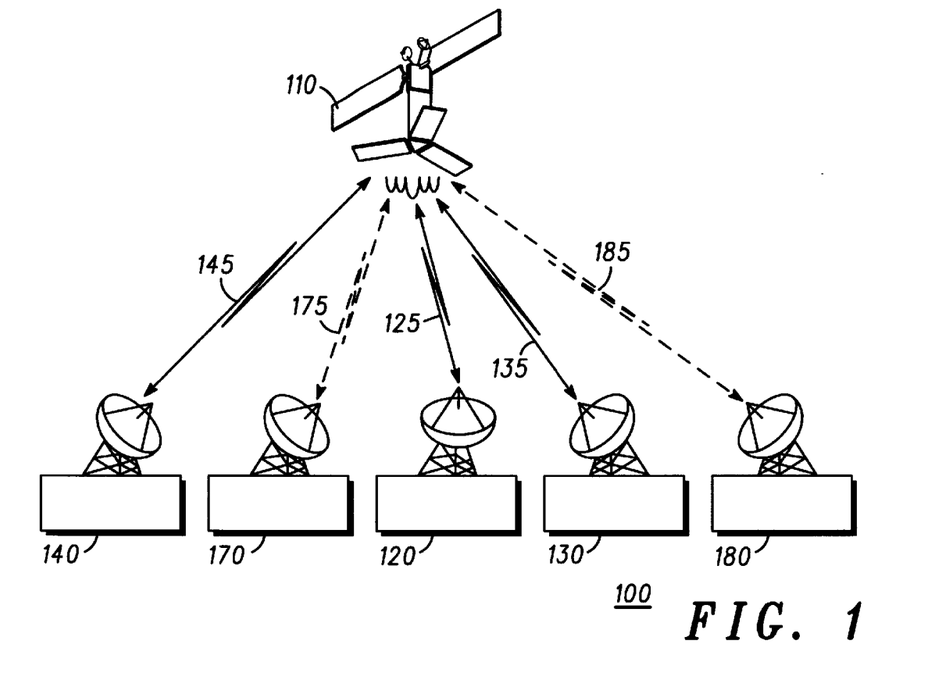
FIG. 1 shows a simplified block diagram of a satellite communication system within which the methods and apparatus of the invention can be practiced.

FIG. 1 shows a simplified block diagram of a satellite communication system within which the method and apparatus of the invention can be practiced. FIG. 1 illustrates a single satellite 110 with digital beamformers in a typical spectrum-sharing scenario. As illustrated, there are several communication paths between satellite 110 and terrestrial-based communication devices 120, 130, and 140. A first beam 125 can be used to establish a link between satellite 110 and terrestrial-based communication device 120. A second beam 135 can be used to establish a link between satellite 110 and terrestrial-based communication device 130. A third beam 145 can be used to establish a link between satellite 110 and terrestrial-based communication device 140. In a preferred embodiment, DOA estimates are determined at satellite 110 for first beam 125, second beam 135, and third beam 145.

In a preferred embodiment, a number of communications satellites, such as illustrated by satellite 110, reside in non-geostationary orbits and are interconnected using crosslinks (not shown). In an alternate embodiment, the communications satellites are not all interconnected. For example, some communication satellites may be in geostationary orbits.

In non-geostationary orbits, satellites can move at high speed relative to any given point on the surface of the earth.

This means that these satellites can come into view at various times with respect to a point on the surface of the earth.

Lower spectral efficiency can be found in current systems because, among other reasons, greater separation is needed among the beams, such as illustrated by beams 125, 135, and 145, to ensure sufficient isolation. When two or more communication beams occupy a common segment of the frequency spectrum, interference between two or more communication channels within these beams can occur. DOA estimation techniques used in the invention are effective in increasing the isolation among the beams because of the beams and nulls can be more accurately positioned.

In FIG. 1, a first interference source 170 and second interference source 180 are also illustrated. A first interference signal path 175 exists between satellite 110 and first interference source 170. A second interference signal path 185 exists between satellite 110 and second interference source 180. In addition, DOA estimates are determined at satellite 110 for interference signal paths 175 and 185.

Digital beamforming methods require that users, illustrated by 120, 130, and 140, are detected and that DOA information be obtained or estimated for them. In some cases, beamforming calculations can be significantly degraded by errors in the DOA data. Several algorithms for estimating directions of arrival are known to those skilled in the art, including decoupled maximum likelihood (DML) and multiple signal classification (MUSIC), but these algorithms have limitations which restrict their performance in a dynamically changing environment.

In a preferred embodiment, satellite 110 employs a digital beamformer (not shown) and a DOAE (not shown) as described below. Satellites 110 and terrestrial-based communication devices 120, 130, and 140 can be viewed as nodes in satellite communication system 100. Those skilled in the art will recognize that the below-discussed features of a preferred embodiment of the invention can be practiced at any node of satellite communication system 100 or any node of other radio frequency (RF) communications systems.

In a preferred embodiment, the directions of arrival for the desired signals and undesired signals in the receive mode and transmit mode are estimated. DOA information is used for the positioning of beams and nulls in both the receive and the transmit modes. To accomplish this, DOA estimates are periodically updated, and control matrices for the digital beamformers are periodically adjusted to maintain the positions for the beam and nulls.

In addition, DOA estimation algorithms can also be used to produce combinations of narrow and wide nulls or, more generally, nulls having desired widths. This flexibility also allows concurrent beams with different beamwidths and different null widths.

In a receive mode, the satellite, at a particular point in time, desirably points a receive beam at a particular terrestrial-based communication device while preferably providing nulls in the antenna's receive pattern in the direction of any interfering signal transmitters. Accordingly, any interference received on an undesired signal path is significantly reduced. For example, interfering signal transmitters can be other users in this communication system, signal sources in other systems, or jamming signals. Desirably, at least one null in the receive antenna pattern of a satellite is directed toward and tracks each undesired signal, which is transmitted within the field of view of that satellite. For example, the field of view can be defined by a current operational field of view or by the entire field of view of the satellite.

In a transmit mode, the satellite desirably points at least one communications beam at a particular terrestrial-based communication device while preferably providing nulls in the antenna's transmit pattern in the direction of any known desired or undesired signal receivers. Again, directions of arrival are used to determine the angular positions for the beam and nulls. The DOA can be determined by a DOAE, which can use, among other things, information associated with the location of the device. For example, GPS information can be used to determine the location of a node in the system.

A digital beamformer, when employed in terrestrial-based communication devices 120, 130, and 140, desirably adjusts its transmit and receive antenna beam characteristics to point at least one beam at the desired satellite while directing at least one null in the direction of an interfering (undesired) signal. For example, an interfering signal can be associated with another satellite in this communications system or in another system.

The accuracy of the DOA estimates is controlled for the most part by the DOA estimation algorithm and its implementation. The accuracy required is governed by the angular separation between desired users, the angular separation between interference sites, and the angular separation between desired users and interference sites.

Figure 2:
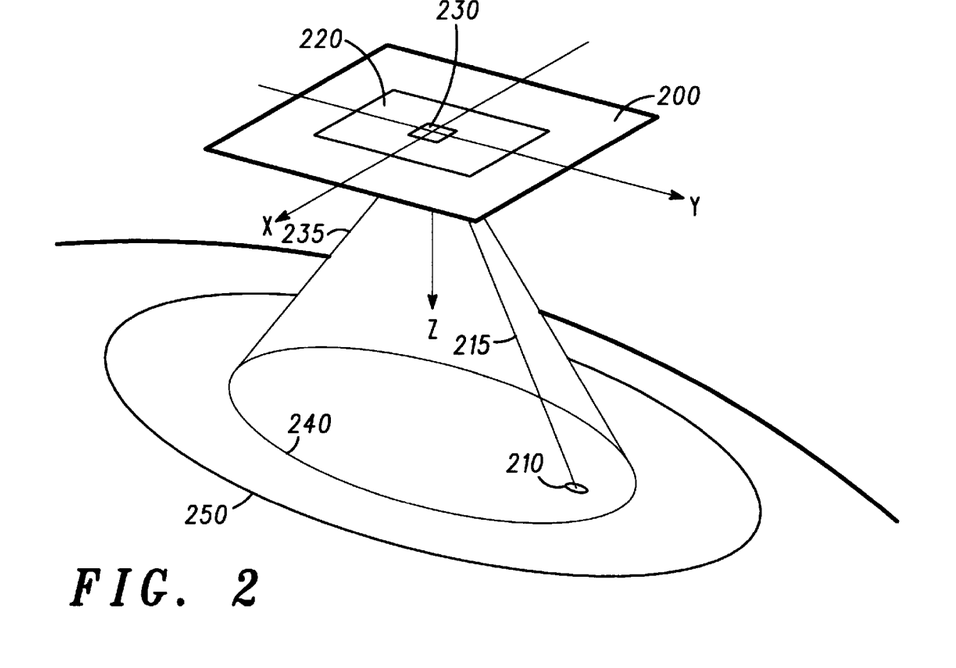
FIG. 2 illustrates a perspective drawing of a planar array of antenna elements and an incident signal from a generalized point source.

FIG. 2 illustrates a perspective drawing of a planar array of antenna elements and an incident signal from a generalized point source. A three-dimensional coordinate system is illustrated having an x-axis, a y-axis, and a z-axis. Planar array 200 comprises a number of elements with mutual separation $d_x$ and $d_y$ in the x and y directions, respectively. In a receive mode, a first set of elements is used, and in a transmit mode, a second set of elements is used. Those skilled in the art will recognize that the first set and the second set can be the same or different. For simplicity of illustration, the center of the coordinate system is positioned at the array's geometrical center.

Point source 210 ($P(r, \theta_j, \phi_j)$) corresponds to the j-th co-channel signal, where r represents the distance from the origin of the coordinate system and $\theta_j$ and $\phi_j$ correspond to the elevation and azimuth angles, respectively. Desirably, ($\theta_j, \phi_j$) are used to designate a DOA estimate for point source 210.

In a preferred embodiment, at least one signal path 215 exists between point source 210 and planar array 200. Desirably, signal path 215 has elevation and azimuth angles ($\theta_j$ and $\phi_j$) associated with it. Directions of arrival can be determined relative to planar array 200 or to point source 210. Point source 210 can represent a receiver in one case, a transmitter in a second case, or a combined receiver/transmitter in another case. Transceivers and transmitters can be desired signal sources and/or undesired signal sources.

Subarray 220 comprises a first subset of the elements in planar array 200. Subarray 220 comprises a large number of antenna elements with individual complex weights, usually at baseband, represented by the vector $\underline{w}$. Reference antenna 230 comprises a second subset of the elements in planar array 200. For simplicity of illustration, a single frequency of operation f and uniform element spacing is assumed, although these restrictions are not required for the invention. Reference antenna 230 has a substantially uniform gain over a desired field of view within a prescribed conical region.

The size of subarray 220 and the size of reference antenna 230 are controlled by software processes within certain hardware limitations, and this allows an adaptable DOA DBF subsystem.

Field of view (FOV) 235 is the operational FOV associated with reference antenna 230. Although the FOV is illustrated with a look direction that is pointing in a particular direction, the look direction can be altered to a limited extent. For example, the look direction can be altered to achieve and maintain improved coverage of existing communication traffic as the satellite moves or to compensate for lost or heavy service demands of neighboring satellites in a constellation.

Footprint 240, as illustrated in FIG. 2, is associated with the FOV of reference antenna 230. Footprint 250 illustrates the potential coverage region for a reference beam associated with planar array 200.

In a preferred embodiment, the received baseband signal from reference antenna 230 is combined with a weighted sum of the individual baseband signals from the antenna elements in subarray 220. Minimizing the composite received power by adjusting the subarray weights gives rise to a composite antenna power pattern that exhibits nulls and low-gain regions corresponding to incident directional signal activity.

Standard digital beamforming is effective in increasing the isolation among the beams beyond that of the sidelobe structure, because beams are formed with mutual narrow nulls among them. Typically, each formed beam can exhibit a single null toward the prescribed direction of an interfering beam. However, standard digital beamforming is limited when considered with respect to its sensitivity to pointing errors, bandwidth, and orbit dynamics, particularly in the context of sticky beams. Sticky beams are beams which have an endpoint that remains substantially fixed on the earth's surface as the satellite moves overhead. When the assigned beam directions deviate from the actual beam directions, the sharp nulls do not coincide with the actual directions. This occurs because the assigned beam directions are no longer centered over the user locations. Consequently, standard digital beamforming provides marginal benefit.

In a preferred embodiment, the limited effectiveness of the narrow nulls of standard digital beamforming is substantially eliminated by enhancing the DOA estimation algorithms to more accurately position beams and nulls. Further, wide mutual nulls add to the isolation among the formed beams even with the motion of the satellite relative to the ground sources.

Figure 3:
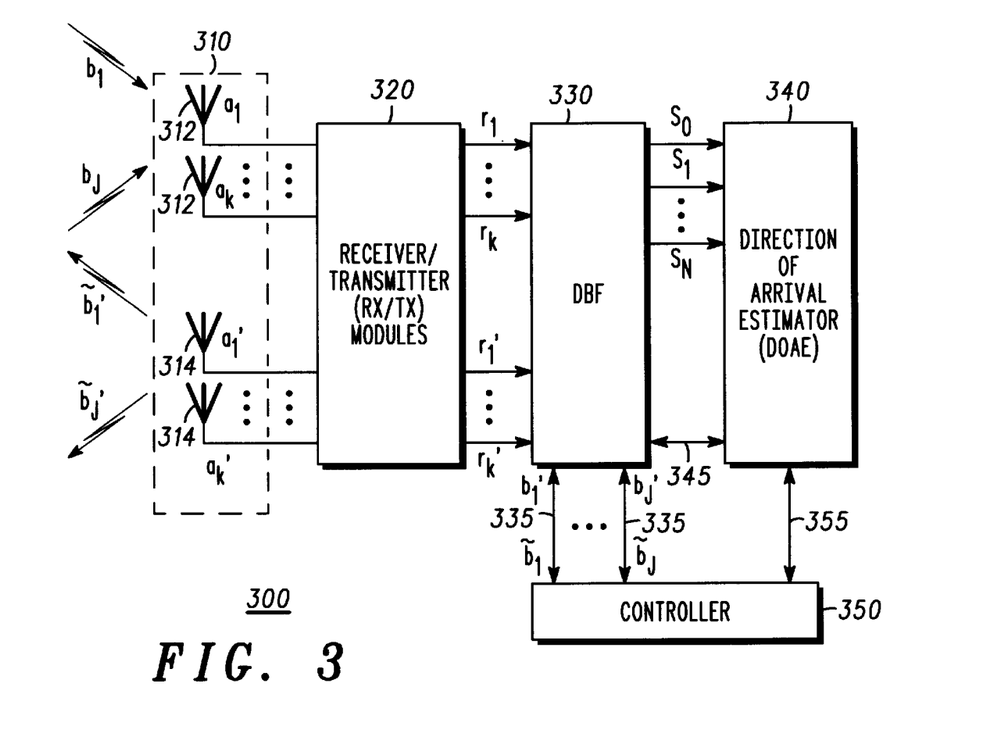
FIG. 3 shows a simplified block diagram of a direction of arrival (DOA)-aided DBF subsystem that includes a digital beamformer and direction of arrival estimator (DOAE) in accordance with a preferred embodiment of the invention.

FIG. 3 shows a simplified block diagram of a direction of arrival (DOA)-aided DBF subsystem that includes a digital beamformer and direction of arrival estimator (DOAE) in accordance with a preferred embodiment of the invention. DOA-aided DBF subsystem 300 includes array-antenna 310, which comprises a plurality of receive (Rx) elements 312, a plurality of transmit (Tx) elements 314, a plurality of receiver/transmitter (Rx/Tx) modules 320, digital beamformer 330, DOAE 340, and controller 350.

Array-antenna 310 includes elements that are preferably arranged in a linear or planar two-dimensional array; however, other array configurations are suitable. Received radio frequency (RF) signals are processed at the element level.

In FIG. 3, antenna elements $a_1$ through $a_k$ are illustrated as receiving elements 312 for incident directional signals $b_1$ through $b_J$. Desirably, there are J directional signals incident on a K-element receive array. In addition, antenna elements $a_1'$ through $a_{K'}'$ are illustrated as transmitting elements 314 for transmitted directional signals $b_1'$ through $b_{J'}'$. Desirably, there are J' directional signals transmitted from a K'-element transmit array.

In a preferred embodiment, at least one separate transmit (Tx) array antenna is used, and at least one receive (Rx) array antenna is used. In addition, Rx/Tx modules 320 comprise some separate receive functions and some separate transmit functions.

In a preferred embodiment, the plurality of receiving elements 312 and the plurality of transmitting elements 314 are controlled using digital beamforming techniques. Desirably, the antenna pattern from an array of receive elements 312 or an array of transmit elements 314 can be steered by applying linear phase weighting across the array. For example, an array pattern can be shaped by the amplitude and phase weighting of the outputs of the individual receive elements 312, and another array pattern can be shaped by the amplitude and phase weighting of the inputs of the individual transmit elements 314. With wide mutual nulls, this option does not degrade the overall performance, as would be the case with narrow mutual nulls.

Rx/Tx modules 320 are coupled to Rx elements 312 and Tx elements 314. Preferably, at least one antenna element is coupled to a Rx/Tx module. When operating in the receive mode, Rx/Tx modules 320 perform, among other things, the Rx functions of frequency down-conversion, filtering, amplification, and A/D conversion. In response to received signals, Rx/Tx modules 320 generate digital data using in-phase (I) and quadrature (Q) A/D converters. I and Q digital data respectively represent real and imaginary parts of a complex analog signal envelope and are processed by DBF 330. Desirably, Rx/Tx modules provide K digital received signals ($r_1$ through $r_K$) to DBF 330.

In addition, when operating in the transmit mode, Rx/Tx modules 320 desirably perform, among other things, the Tx functions of frequency up-conversion, filtering, amplification, and D/A conversion. D/A converters convert digital data into corresponding analog signals for each Tx array element. Rx/Tx modules 320 generate signals suitable for transmission by Tx array elements from digital data received from DBF 330. Desirably, Rx/Tx modules are provided K' digital transmit signals ($r_1'$ through $r_{K'}'$) by DBF 330.

Digital beamformer 330 is coupled to Rx/Tx modules 320. Digital data is exchanged between DBF 330 and Rx/Tx modules 320. DBF 330 implements beam forming and beam steering functions necessary to form antenna beam patterns with the desired characteristics. DBF 330 forms receive and transmit beams for the reception and transmission of directional signals with minimal inter-beam interference.

In addition, DBF 330 is coupled via 335 to controller 350. Digital data is exchanged between DBF 330 and controller 350. Digital data includes data for operating in the receive mode and the transmit mode as well as other data for control. As illustrated in FIG. 3, DBF 330 provides the received beam port signals ($\hat{b}_1$ through $\hat{b}_J$) to controller 350. These signals are optimal estimates of the incident signals ($b_1$ through $b_J$).

DBF 330 obtains the transmit beam port signals ($b'_1$ through $b'_{J'}$) from controller 350. The actual transmitted signals ($\hat{b}'_1$ through $\hat{b}'_{J'}$) are optimal representations of the original versions ($b'_1$ through $b'_{J'}$). One of the functions of the digital beamformer is to derive T and T' transformation matrices which, operating on received and transmitted signals, respectively, produce optimal estimates of incident and actually transmitted signals.

In a preferred embodiment, DBF 330 uses a best linear unbiased estimator (BLUE). This algorithm adjusts the weight coefficients of the array to achieve a minimumvariance signal estimate. The BLUE algorithm forces deep nulls in the direction of interfering signals for each beam, and therefore, it is susceptible to pointing errors. Accurate DOA estimation techniques are used with the BLUE algorithm to increase its effectiveness. In addition, variable width nulls enhance the inter-beam isolation providing further robustness against noise and motion.

DOAE 340 is coupled 345 to DBF 330 and is coupled 355 to controller 350. Digital data is exchanged between DOAE 340, DBF 330, and controller 350. In a preferred embodiment, DOAE 340 obtains antenna configuration data from controller 350. In addition, controller 350 can provide initial values for directions of arrival, calculated values for directions of arrival, and stored values of directions of arrival.

DOAE 340 provides, among other things, reference antenna weights, and subarray weights to DBF 330. DOAE 340 uses knowledge of existing beams to enhance its search strategy for new directional incident signal activity. Desirably, DOAE 340 obtains existing beam information from DBF 330 and controller 350. Also, DOAE 340 uses, among other things, beam width and null width information to determine its beam assignment strategy.

DOAE 340 is used to compute, among other things, covariance matrices, and cross-correlation vectors as discussed below. In a preferred embodiment, DOAE 340 employs a relaxation algorithm that is numerically stable and does not impose a requirement that the underlying covariance matrix have an inverse.

In a preferred embodiment, DOAE 340 comprises one or more parallel processors. DOAE 340 stores data that serve as its instructions and that, when executed, cause DOAE 340 to carry out procedures that are discussed below. In alternate embodiments, DOAE 340 can be implemented using digital signal processors. In other embodiments, DOAE 340 can be implemented using special processors, which can include logarithm converters, inverse logarithm converters, and parallel processors.

For example, the processors, used in DBF 330, DOAE 340, and controller 350, can use logarithmic number system (LNS) arithmetic. LNS-based arithmetic provides an advantage because multiplication operations can be accomplished with adders instead of multipliers. A LNS-based processor can include log converters, summing circuits, weighting circuits, and inverse-log converters 1. In alternate embodiments, DBF 330 and DOAE 340 can share computational resources.

In a preferred embodiment, DOAE 340 uses an N-element receive subarray to determine the distribution of directions of arrival over a desired field of view. Desirably, N is a positive integer that is less than the total number of elements in the receive antenna array. Because a robust relaxation algorithm is employed, DOAE 340 is not restricted to use an N-dimensional subarray but can actually employ the full array to achieve a finer definition of the directional distribution of incident signal power. As illustrated in FIG. 3, DOAE 340 receives sampled signals $s_0, s_1, \ldots s_N$, where $s_0$ is the reference port signal, and $\underline{s}$ ($[s_1, \ldots s_N]^T$) is the N-component subarray signal vector.

By taking M consecutive time samples of each of these signals, the following quantities can be defined:

$$\underline{s}_0 = \begin{bmatrix} s_0(1) \\ \vdots \\ s_0(M) \end{bmatrix},$$

and $$S = \begin{bmatrix} s_1(1) & \ldots & s_N(1) \\ \cdot & \ldots & \cdot \\ \cdot & \ldots & \cdot \\ \cdot & \ldots & \cdot \\ s_1(M) & \ldots & s_N(M) \end{bmatrix},$$

where $\underline{s}_0$ represents the complex M-component reference port signal vector with components which are samples of $s_0$(t) at sample times t=1, ..., M; and S represents the complex M×N subarray signal matrix comprising M time samples of $\underline{s}^T$(t).

In a preferred embodiment, the reference port signal samples are combined with a weighted sum of the N subarray port signal samples to form the composite signal samples $S\underline{w}+\underline{s}_0$, where $\underline{w}$ is an N-dimensional complex weight vector. Then, the corresponding received composite power is proportional to $$P_c(\underline{w}) = \|S\underline{w} + \underline{s}_0\|^2$$

which is a quadratic function of $\underline{w}$, and which attains a minimum value when $\underline{w}$ satisfies the linear system $$C\underline{w} + \underline{d} = \underline{0}$$

in some appropriate sense (e.g., least-mean-square sense, etc.).

In this case, C is the N×N complex subarray signal covariance matrix, and $\underline{d}$ is the N-component subarray/reference signal cross-correlation vector, given respectively by $$C = S^{*T}S$$

and $$\underline{d} = S^{*T}\underline{s}_0.$$

The solution to the linear system ($C\underline{w}+\underline{d}=\underline{0}$) is essentially the inversion $$\underline{w} = -C^{-1}\underline{d}$$

although this may not be numerically reliable in general. For example, if C is ill-conditioned, direct matrix inversion is numerically unreliable. This is particularly true when the linear system is over-determined; that is, when N is greater than the number of incident signals. Eigenspace techniques, including Singular Value Decomposition (SVD), Pseudoinverse, and Batch Covariance Relation (BCR) are numerically stable and robust alternatives for determining an optimal estimate of $\underline{w}$. Consequently, these techniques are more suitable for solving ill-conditioned systems and more appropriate for use in the DOAE.

In a preferred embodiment, the BCR approach is used. The advantage of the BCR technique is that it is numerically stable, even with limited arithmetic resolution, and the BCR technique can be applied iteratively to improve a current estimate for $\underline{w}$, thereby allowing incremental refinements in a varying environment.

Given the weight vector solution, $\underline{w}$, and assuming a planar antenna array as shown in FIG. 3, the composite antenna radiation pattern as a function of $(\phi,\theta)$ is given by $$E_c(\phi, \theta) = E_0(\phi, \theta) + \sum_{n=1}^{N} w_n E_n(\phi, \theta) e^{-i\pi\sin\theta(x_n\cos\phi + y_n\sin\phi)}$$

where $(x_n, y_n)$ is the half-wavelength normalized xy-location of the n-th antenna element. In a preferred embodiment, $E_c(\phi,\theta)$ is a composite pattern; $E_0(\phi,\theta)$ is a reference pattern; and $E_n(\phi,\theta)$ is an embedded element pattern.

Then, the receive composite antenna power pattern is given by $$P_c(\phi,\theta) = |E_c(\phi,\theta)|^2.$$

Computing this pattern over a range of $(\phi,\theta)$, reveals nulls and low gain regions that are indicative of incident directional signal activity. Another view of this directional signal profile is obtained by normalizing the combined power with respect to the reference antenna power pattern, and this yields a composite power pattern relative to that of the reference $$P_0(\phi,\theta) = |E_0(\phi,\theta)|^2.$$

in the form of the reciprocal of the normalized composite power pattern $$P(\phi, \theta) = \frac{|E_0(\phi, \theta)|^2}{|E_c(w, \phi, \theta)|^2}.$$

The reciprocal normalized composite power pattern exhibits an incident signal directional profile in the form of peaks and high regions relative to the reference antenna power pattern, as a function of the direction angles $\phi$, and $\theta$. In this sense, $P(\phi,\theta)$ is an estimate of incident directional power referenced to unity.

Knowledge of the normalized combined power pattern allows peak-finding techniques to be applied to identify the directions of incident signal activity within the field of view of a DOA estimation subsystem. Then, using knowledge of achievable beamwidths for DBF beams, it is possible to specify beam directions that provide optimal coverage, in some practical sense. Furthermore, with the knowledge of the current beam directions, the DOA estimation subsystem needs to only search for new beam directions and this technique eliminates unnecessary computations.

The computational complexity involved with this search technique depends on a number of factors including the step sizes used for $\phi$ and $\theta$. For example, the complexity is also dependent on the accuracy required for the directions of arrival and the size of the search range in the desired FOV.

In addition, incident signal energy having certain spectral characteristics can be used to determine where to induce nulls into the composite power pattern or a peak directional power estimate. When an incident signal is identified as an undesired signal (interference), then its DOA information is important to a DBF system. Desirably, the DBF system utilizes this knowledge to place a null at this point in each of the beams the DBF system forms. In an alternate embodiment, a DBF system can form a beam in this direction in an attempt to further identify the undesired interference. By intelligently positioning nulls, undesired signals or jamming signals are suppressed using the DOA information.

Gains in capacity, reduced interference, and improved performance can be achieved using a DOA-aided DBF subsystem. Typically, digital beamforming refers to the creation of multiple, simultaneous, independently controlled beams at baseband, which are controlled through digital signal processing.

A DOA-aided DBF subsystem, with an enhanced DOA estimation capability, allows a communication system to employ a resource allocation policy that assigns beams to sources and nulls to interferers to optimize total capacity and quality of service. For example, using an enhanced DOA estimation capability, antenna patterns can be established to have beam and null positions that vary according to traffic density.

DOA-aided DBF subsystem 300 shown in FIG. 3 has advantages over conventional systems with fixed beam antennas because it, among other things, adaptively adjusts antenna patterns and produces accurately positioned beams and nulls in response to received data. Desirably, the received data is used to accurately estimate the DOA for desired and undesired incident signals. In other words, DOA-aided DBF subsystem 300 provides accurate antenna beam pointing in response to demand for communication services, and it provides improved null positioning to lessen the impact of unwanted RF signals. These features are implemented through appropriate software embedded in DBF 330, DOAE 340, and controller 350.

For digital beamforming methods to be effective in a satellite communication system in which the users and satellites change position relative to each other, the DOA information must be updated as the satellites and users move relative to each other.

In a preferred embodiment, the DOA is estimated for signals incident to at least one antenna array on a satellite. This information can be used, for example, to improve the allocation of resources by placing beams on active and high-traffic areas and by not placing beams on inactive regions. This improvement in resource allocation can enhance overall performance and reduce on-board power consumption.

Figure 4:
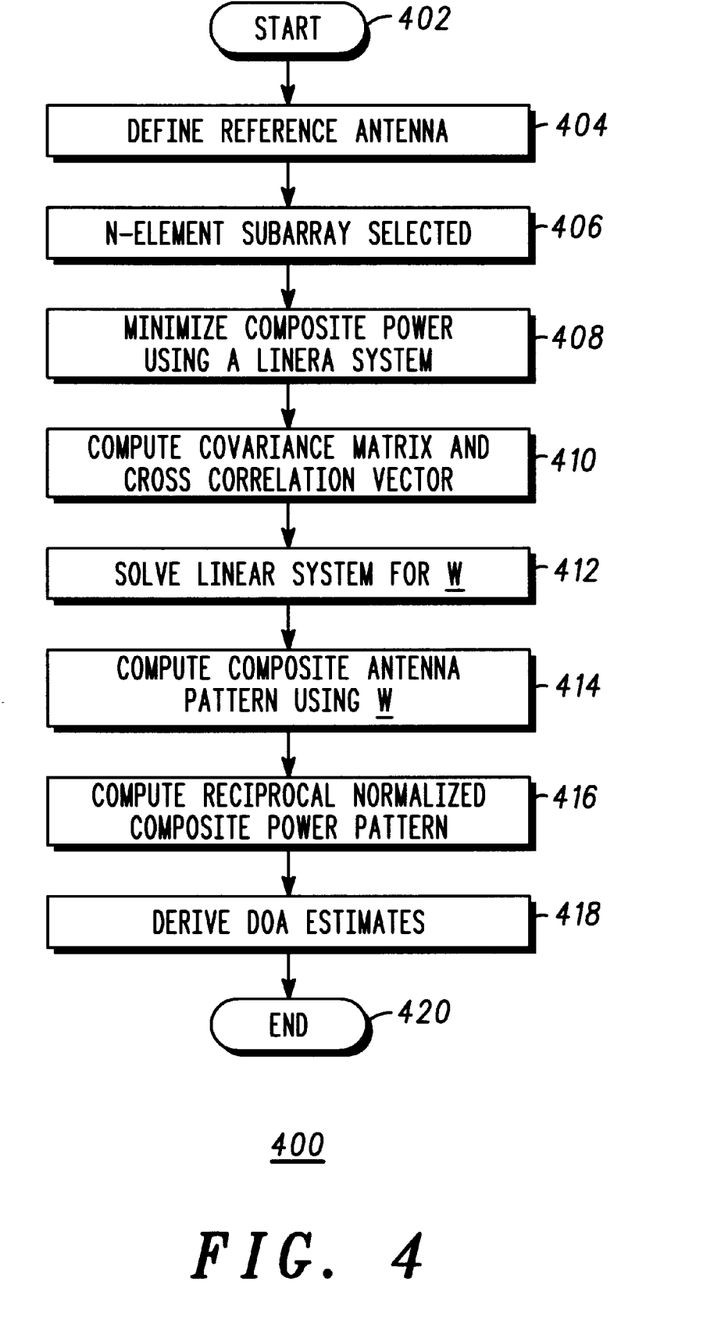
FIG. 4 illustrates a flow diagram of a procedure for determining directions of arrival in a DOA-aided DBF subsystem in accordance with a preferred embodiment of the invention.

FIG. 4 illustrates a flow diagram of a procedure for determining directions of arrival in a DOA-aided DBF subsystem in accordance with a preferred embodiment of the invention. Procedure 400 starts in step 402.

In step 404, a reference antenna is defined. In a preferred embodiment, the reference antenna forms a reference beam that covers a desired field of view while rejecting the remaining space with a sufficiently low sidelobe structure.

In a preferred embodiment, the elements that are used to define the reference antenna are not hardware dependent. The reference antenna is dynamically controlled by the DOAE. Desirably, the reference antenna varies as the size of the field of view changes and as the direction for the field of view changes. For example, in a non-geostationary satellite system fields of view change as the satellites move with respect to the surface of the earth. In addition, fields of view can be changed when beams are moved from light traffic areas to heavy traffic areas.

In step 406, an N-element subarray is selected. In a preferred embodiment, the N-element array is a subarray in the receive antenna array. In other embodiments, the N-element array is the entire receive array. Desirably, N changes as requirements change.

Given a large digitally controlled antenna array, the invention uses a weighted subarray in combination with a reference antenna to determine the distribution of directions of arrival over a desired field of view. The relaxation algorithm employed is numerically stable and robust imposing no requirement that the underlying covariance matrix have an inverse. Consequently, the system is not restricted to use a small subarray but can actually employ the full array to achieve a finer definition of the directional distribution of incident power.

In a preferred embodiment, the matrix S is determined, where S represents the complex M×N subarray signal matrix with components which correspond to M time samples at sample times t=1, . . . , M and N subarray elements numbered from 1 to N.

In a preferred embodiment, $\underline{s}_0$ is determined, where $\underline{s}_0$ represents the complex M-component reference port signal vector with components which are samples of $s_0(t)$ at sample times t=1, . . . , M;

In addition, the field of view can be changed to some extent when DOA estimates are required for a specific area.

In step 408, the composite received power is given by:

$$P_c(\underline{w}) = \|S\underline{w} + \underline{s}_0\|^2$$

which is a quadratic function of $\underline{w}$, and which attains a minimum value when $\underline{w}$ satisfies the linear system $$C\,\underline{w} + \underline{d} = \underline{0},$$

where C is the covariance matrix and $\underline{d}$ is the cross-correlation vector as described below.

In step 410, the covariance matrix is computed. In a preferred embodiment, a complex baseband signal covariance matrix is computed via:

$$C = S^{*T}S.$$

In addition, a cross-correlation vector is computed. In a preferred embodiment, the cross-correlation vector is computed between the reference array and the N-element array via $$\underline{d} = S^{*T}\underline{s}_0$$

where S comprises M time samples of the subarray signal vector $\underline{s}(t)$.

In step 412, the linear system of step 408 is solved for $\underline{w}$, which is an N-dimensional complex weight vector over the N-element subarray. In a preferred embodiment, BCR or related eigenspace techniques are used.

In step 414, a composite antenna pattern is computed using the previously obtained value for $\underline{w}$. In a preferred embodiment, the composite antenna pattern, $E_c(\phi,\theta)$, is computed.

In step 416, the reciprocal normalized composite power pattern $P(\phi,\theta)$ is computed for a plurality of points $(\phi,\theta)$ within a desired field of view.

In step 418, the DOA estimates are derived for the plurality of incident signals from the reciprocal normalized composite power pattern $P(\phi,\theta)$ computed at the plurality of points $(\phi,\theta)$. In a preferred embodiment, peak finding techniques are used to locate the peaks of $P(\phi,\theta)$ in $(\phi,\theta)$ space corresponding to the DOA estimates.

In step 420, procedure 400 ends. Procedure 400 is used to calculate a composite power pattern for a plurality of points within a desired field of view, and to derive DOA estimates for at least one incident signal by applying at least one peak-finding technique to the composite power pattern. Next, the DOA-aided DBF subsystem establishes a beam in a direction substantially equal to the DOA estimate, when said incident signal is a desired signal; and the DOA-aided DBF subsystem directs a null in a direction substantially equal to the DOA estimate, when the incident signal is from an undesired source.

Figure 5:
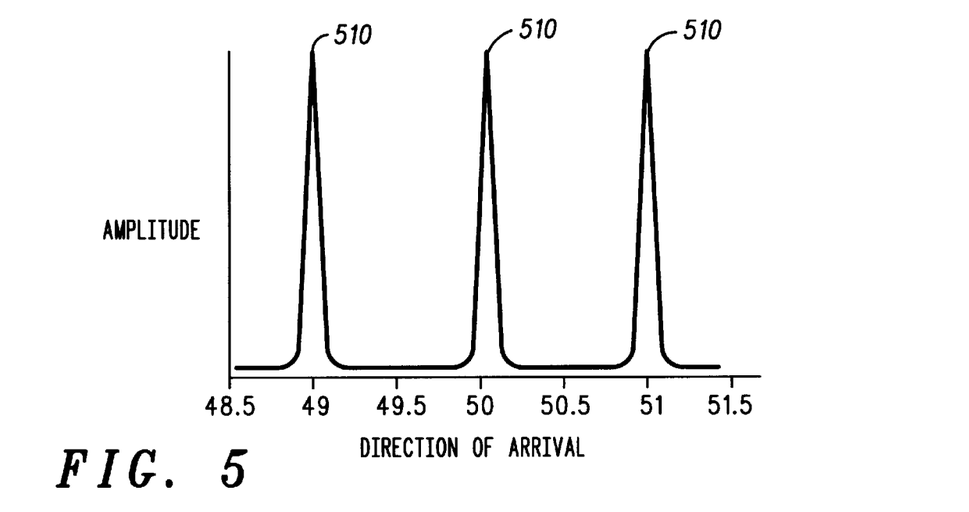
FIG. 5 shows a graph that illustrates the directional signal activity estimated by the DOA algorithm.

FIG. 5 shows a graph that illustrates the directional signal activity estimated by the DOA algorithm. Three peaks 510, indicative of signal activity at three different directions of arrival, were produced in this example using DOA estimation techniques. Calculations were performed using BCR and pseudo-inverse techniques to solve for $\underline{w}$ for a multi-element linear array. In this example, the directions of arrival for the incident signals occurred at 49, 50, and 51 degrees.

Because a DOA-aided DBF subsystem includes both beam steering and null steering, the computing load increases and becomes more complex. Suitable techniques are used to accomplish this. For example, using the BLUE DBF algorithm in combination with DOA estimation techniques provides a good tradeoff between performance and complexity. This combination allows the simultaneous steering of beams in the directions of the desired users and the steering of nulls in the direction of interfering signals.

Computational complexity is also managed by controlling when calculations are performed. Desirably, the DOA estimation calculations are performed as required. For example, the update rate is dependent on a number of factors including, among other things, changes in satellite position relative to the desired and undesired transmitters and receivers. If the rate of change of the elevation angle is 0.05690°/sec, then this corresponds to 0.005°/frame, assuming a frame length of 90 msec. When a correction of the beamformer is required every 0.5°, then DOA information needs to be updated every 100th frame. This can be done using appropriate digital signal processors.

In a DOA-aided DBF system, the computational complexity can be reduced by making iterative updates to the DOA estimates. The BCR technique allows iterative $\underline{w}$ updates to be made, thereby providing an essentially continuous refinement of DOA estimates. For example, DOA computations can be distributed and time-shared with DBF computations. Desirably, these options allow the economic use of available computational resources. Furthermore, peak detection can be made more computationally efficient by using iterative updating and searching near previously identified peaks.

In addition, when wide mutual nulls are used among the beams, the update rate for the DOA estimates is reduced. Desirably, wide mutual nulls make the overall system more robust.

In a DOA-aided DBF system, the computational complexity can also be reduced by using approximate estimates of the DOA for at least some of the incident signals. Desirably, approximate estimates for directions of arrival are obtained for users during an acquisition phase. For example, wider FOVs and wider beams can be used during the acquisition phase.

Furthermore, the computational complexity can be reduced using narrow-banding techniques. For example, DOA estimation techniques can be formulated for a single frequency of operation, presumably the center frequency of a communication system's operational bandwidth. For narrowband systems, where the bandwidth B is a small fraction of the carrier frequency $f_c$, one could safely apply the DOA estimation techniques at $f_c$, yielding very little performance degradation at the band edges. However, as the fractional bandwidth $B/f_c$ increases, the degradation manifests itself in increased estimation errors. In this case, DOA estimates may be derived for individual subbands in a time-shared fashion.

In alternate embodiments, a GPS-aided location system can also be used to obtain the directions of arrival. In these embodiments, location system data can be used to provide limits and initial conditions for BCR. For example, DOA estimation algorithms could be used to identify unknown sources of interference. In other embodiments, coarse location data can be provided to terrestrial based devices by satellites in a communications system.

The method and apparatus of the present invention enable the capabilities of a satellite communication system to be greatly enhanced by using antenna patterns with accurately positioned beams and nulls. Using accurately positioned nulls to minimize the effect of interfering signals can be optimized for various missions, and additional cost benefits can be accrued by the system using the method and apparatus of the invention. Furthermore, using the method and apparatus of the present invention with wide nulls adds to the overall system robustness.

The invention has been described above with reference to a preferred embodiment. However, those skilled in the art will recognize that changes and modifications can be made in this embodiment without departing from the scope of the invention. For example, while a preferred embodiment has been described in terms of using a specific block diagram for the transceiver, other systems can be envisioned which use different block diagrams. Also, although BCR is the preferred algorithm for updating the adaptive weight vector, other equivalent techniques can be applied. Accordingly, these and other changes and modifications which are obvious to those skilled in the art are intended to be included within the scope of the invention.

What is claimed is:

1. A method of operating a direction of arrival (DOA)-aided digital beam forming (DBF) subsystem, wherein a direction of arrival estimator (DOAE) determines direction of arrival (DOA) estimates for incident signals received by an array antenna, said method comprising the steps of:

calculating a composite power pattern for a plurality of points within a desired field of view;

deriving said DOA estimates for said incident signals by applying at least one peak-finding technique to said composite power pattern;

establishing a beam in a direction substantially equal to a DOA estimate for one of said incident signals, when said one of said incident signals is a desired signal; and directing nulls in directions substantially equal to DOA estimates for others of said incident signals, when said others are undesired sources.

2. The method as claimed in claim 1, wherein said calculating step further comprises the step of:

calculating $P_c(\phi,\theta)$ for a plurality of points $(\phi,\theta)$ within said desired field of view, wherein $P_c(\phi,\theta)$ is said composite power pattern, and is defined as $$P_c(\phi,\theta)=|E_c(\phi,\theta)|^2,$$

wherein $$E_c(\phi, \theta) = E_0(\phi, \theta) + \sum_{n=1}^{N} w_n E_n(\phi, \theta) e^{-i\pi \sin\theta(x_n \cos\phi + y_n \sin\phi)}$$

wherein $E_0(\phi,\theta)$ is a reference radiation pattern for said array antenna, $E_n(\phi,\theta)$ is an embedded radiation pattern of an n-th subarray element, $(x_n, y_n)$ is a half-wavelength normalized location for said n-th subarray element in an x-y plane of said array antenna, and $w_n$ is an n-th component of $\underline{w}$, which is a weight vector solution to a linear system $C\ \underline{w}+\underline{d}=\underline{0}$.

3. The method as claimed in claim 2, wherein said calculating step further comprises the step of solving said linear system using eigenspace techniques, wherein C is an N×N complex subarray signal covariance matrix, and $\underline{d}$ is an N-component subarray/reference signal cross-correlation vector.

4. The method as claimed in claim 3, wherein said calculating step further comprises the step of calculating C using $C=S^{*T}S$.

5. The method as claimed in claim 4, wherein said calculating step further comprises the step of calculating $\underline{d}$ using $\underline{d}=S^{*T}\underline{s}_0$.

6. The method as claimed in claim 5, wherein said calculating step further comprises the steps of:

calculating S using $$S = \begin{bmatrix} s_1(1) & \cdots & s_N(1) \\ . & \cdots & . \\ . & \cdots & . \\ . & \cdots & . \\ s_1(M) & \cdots & s_N(M) \end{bmatrix}; \text{ and}$$

using $$\underline{s}_0 = \begin{bmatrix} s_0(1) \\ \vdots \\ s_0(M) \end{bmatrix},$$

wherein $\underline{s}_0$ represents a complex M-component reference port signal vector with components which are samples of $s_0(t)$ at sample times t=1 through t=M, and S represents a complex M×N subarray signal matrix with components which correspond to M time samples at sample times t=1 through t=M and N subarray elements numbered from 1 to N.

7. The method as claimed in claim 4, wherein said solving step further comprises the step of determining $\underline{w}$ using a Batch Covariance Relaxation (BCR) algorithm.

8. The method as claimed in claim 4, wherein said solving step further comprises the step of determining $\underline{w}$ using a Singular Value Decomposition (SVD) algorithm.

9. The method as claimed in claim 1, wherein said method further comprises the step of selecting said desired field of view to cover a selected area.

10. The method as claimed in claim 1, wherein said method further comprises the step of selecting said desired field of view to cover at least one desired signal.

11. The method as claimed in claim 1, wherein said method further comprises the step of selecting said desired field of view to cover at least one undesired signal.

12. The method as claimed in claim 1, wherein said method further comprises the step of selecting said desired field of view based on a service demand.

13. The method as claimed in claim 1, wherein said method further comprises the step of selecting said desired field of view based on an operating frequency of said incident signals.

14. The method as claimed in claim 1, wherein said method further comprises the step of selecting said desired field of view based on a time-of-arrival of said incident signals.

15. In an antenna array comprising a plurality of antenna elements, wherein a plurality of incident signals are received at said antenna array, a method for deriving a direction of arrival (DOA) estimate for one of said plurality of incident signals, said method comprising the steps of:

downconverting said plurality of incident signals into a plurality of digital received signals;

determining, by a digital beamformer, a plurality of digital baseband signals from said plurality of digital received signals; and processing, by a direction of arrival estimator (DOAE), said plurality of digital baseband signals.

16. The method as claimed in claim 15, wherein said processing step comprises the steps of:

receiving M consecutive time samples of a complex scalar reference port signal; and receiving M consecutive time samples of a complex N-component sampled signal vector.

17. The method as claimed in claim 16, wherein said processing step comprises the steps of:

combining said M consecutive time samples of a complex scalar reference port signal and said M consecutive time samples of a complex N-component sampled signal vector to form composite signal samples; and defining a composite power using said composite signal samples.

18. The method as claimed in claim 17, wherein said processing step comprises the steps of:

using a linear system to minimize said composite power, said linear system being defined by $C\underline{w}+\underline{d}=\underline{0}$, wherein C is a complex baseband signal covariance matrix over N elements of said plurality of antenna elements, wherein N is a positive integer, and $\underline{d}$ is a cross-correlation vector between a reference array and a subarray comprising said N elements; and solving for $\underline{w}$ in said linear system of equations.

19. The method as claimed in claim 18, wherein said solving step comprises the step of:

computing a complex baseband signal covariance matrix using $$C = S^{*T}S$$

wherein S is a M-sample shifted complex signal matrix over said N elements and is defined by $$S = \begin{bmatrix} s_1(1) & \ldots & s_N(1) \\ . & \ldots & . \\ . & \ldots & . \\ . & \ldots & . \\ s_1(M) & \ldots & s_N(M) \end{bmatrix}.$$

20. The method as claimed in claim 19, wherein said solving step comprises the step of:

computing said cross-correlation vector using $$\underline{d} = S^{*T}\underline{s}_0.$$

wherein $\underline{s}_0$ represents a complex M-component reference port signal vector with components which are samples of $s_0(t)$ at sample times $t=1, \ldots, M$.

21. The method as claimed in claim 18, wherein said solving step comprises the step of:

using matrix inversion, wherein $\underline{w} = C^{-1}\underline{d}$.

22. The method as claimed in claim 21, wherein said solving step comprises the step of:

using eigenspace techniques to solve for $\underline{w}$.

23. The method as claimed in claim 21, wherein said solving step comprises the step of solving for $\underline{w}$ using Batch Covariance Relaxation (BCR) technique.

24. The method as claimed in claim 23, wherein said solving step comprises the step of iteratively solving for $\underline{w}$ using Batch Covariance Relaxation (BCR) technique.

25. The method as claimed in claim 15, wherein said processing step comprises the steps of:

computing a composite antenna pattern $E_c(\phi,\theta)$, wherein $$E_c(\phi, \theta) = E_0(\phi, \theta) + \sum_{n=1}^{N} w_n E_n(\phi, \theta) e^{-i\pi \sin\theta(x_n \cos\phi + y_n \sin\phi)}$$

wherein $(x_n, y_n)$ is a half-wavelength normalized xy-location of an n-th antenna element, $E_c(\phi,\theta)$ is a composite pattern, $E_0(\phi,\theta)$ is a reference pattern, and $E_n(\phi,\theta)$ is an embedded element pattern;

computing reciprocal composite power $P(\phi,\theta)$ for a plurality of points $(\phi,\theta)$ within a desired field of view, wherein $$P(\phi, \theta) = \frac{\|E_0(\phi, \theta)\|^2}{\|E_c(\phi, \theta)\|^2}; \text{ and}$$

deriving said DOA estimate for said one of said plurality of incident signals from said reciprocal power computed at said plurality of points.

26. A direction of arrival (DOA)-aided digital beamforming (DBF) subsystem comprising:

at least one antenna array having a plurality of elements;

a plurality of receive/transmit (Rx/Tx) modules coupled to said plurality of elements;

a digital beamformer (DBF) coupled to said plurality of Rx/Tx modules, said DBF controlling N elements of said plurality of elements to establish a plurality of beams;

a direction of arrival estimator (DOAE) coupled to said DBF, said DOAE for determining direction of arrival (DOA) estimates for said plurality of beams;

a controller coupled to said DBF and to said DOAE;

means for selecting a first receive subarray of said plurality of elements as a reference array;

means for selecting a second receive subarray of said plurality of elements;

means for combining weighted received signals from said second receive subarray and reference array signals from said first receive subarray;

means for determining a complex baseband signal covariance matrix C for said first receive subarray;

means for determining a complex cross-correlation vector $\underline{d}$ using said first receive subarray and said second receive subarray;

means for determining a complex weight vector $\underline{w}$ that minimizes received power at said at least one antenna array;

means for determining a normalized pattern for said at least one antenna array using said complex weight vector $\underline{w}$; and means for determining said direction of arrival estimates using at least one maximum point in said normalized pattern.

27. A direction of arrival (DOA)-aided digital beamforming (DBF) subsystem comprising:

at least one antenna array having a plurality of elements;

a plurality of receive/transmit (Rx/Tx) modules coupled to said plurality of elements;

a digital beamformer (DBF) coupled to said plurality of Rx/Tx modules, said DBF controlling N elements of said plurality of elements to establish a plurality of beams;

a direction of arrival estimator (DOAE) coupled to said DBF, said DOAE for determining direction of arrival (DOA) estimates for said plurality of beams;

a controller coupled to said DBF and to said DOAE;

means for selecting a first receive subarray of said plurality of elements as a reference array;

means for selecting a second receive subarray of said plurality of elements;

means for combining weighted received signals from said second receive subarray and reference array signals from said first receive subarray;

means for determining a complex baseband signal covariance matrix C for said first receive subarray;

means for determining a complex cross-correlation vector $\underline{d}$ using said first receive subarray and said second receive subarray;

means for determining a complex weight vector $\underline{w}$ that minimizes received power at said at least one antenna array;

means for determining a composite pattern for said at least one antenna array using said complex weight vector $\underline{w}$; and means for determining said direction of arrival estimates using at least one minimum point in said composite pattern.

* * * * *